(12) United States Patent
Choi et al.

(10) Patent No.: US 7,293,236 B2
(45) Date of Patent: Nov. 6, 2007

(54) SYSTEM AND METHOD FOR CONTROLLING DEVICES IN HOME NETWORK ENVIRONMENT

(75) Inventors: Cheol-won Choi, Seoul (KR); Song-yean Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 364 days.

(21) Appl. No.: 10/121,597

(22) Filed: Apr. 15, 2002

(65) Prior Publication Data

US 2002/0163534 A1 Nov. 7, 2002

(30) Foreign Application Priority Data

Apr. 13, 2001 (KR) ................... 2001-19941

(51) Int. Cl.
G06F 15/177 (2006.01)
G06F 3/00 (2006.01)
G06F 15/173 (2006.01)

(52) U.S. Cl. ............... 715/734; 715/740; 709/223; 725/37

(58) Field of Classification Search ........ 715/734, 715/736, 735, 737, 738, 740; 709/218, 220, 709/201, 223; 725/37
See application file for complete search history.

(56) References Cited

U.S. PATENT DOCUMENTS

| | | | | |
|---|---|---|---|---|
| 5,437,009 A | * | 7/1995 | Lane | 345/636 |
| 5,617,526 A | * | 4/1997 | Oran et al. | 715/779 |
| 5,956,487 A | * | 9/1999 | Venkatraman et al. | 709/218 |
| 6,600,500 B1 | * | 7/2003 | Yamamoto | 715/795 |
| 6,615,088 B1 | * | 9/2003 | Myer et al. | 700/20 |
| 6,618,754 B1 | * | 9/2003 | Gosling | 709/220 |
| 6,628,311 B1 | * | 9/2003 | Fang | 715/777 |
| 6,735,615 B1 | * | 5/2004 | Iwayama et al. | 709/204 |
| 2001/0034754 A1 | * | 10/2001 | Elwahab et al. | 709/201 |
| 2001/0052013 A1 | * | 12/2001 | Munguia et al. | 709/225 |

FOREIGN PATENT DOCUMENTS

| | | |
|---|---|---|
| CN | 1269033 A | 10/2000 |
| JP | 06-187272 | 7/1994 |
| JP | 09-161181 | 6/1997 |
| JP | 2000-512472 | 9/2000 |
| KR | 10-2001-105724 A | 11/2001 |

OTHER PUBLICATIONS

Interoperability Technology Association for Information Processing: "RG (residential gateway) survey report" (online) Mar. 2000, (retrieved Feb. 17, 2005,) Internet.

* cited by examiner

Primary Examiner—Tadesse Hailu
Assistant Examiner—Ting Zhou
(74) Attorney, Agent, or Firm—Sughrue Mion Pllc.

(57) ABSTRACT

A method and system for displaying status information about each of a plurality of devices and transmitting control information in a home network environment are provided. Includes (a) running an application program for providing a user interface; (b) the control device receiving status information from the controlled devices; (c) the application program displaying controlled devices in operation on the display referring to the status information received in step (b); (d) displaying a web page indicative of operation of a selected controlled device upon selection by a user; and (e) transmitting a control command to the controlled device. The application program may be system independent of an execution environment of a controlled device and run directly by a web browser.

25 Claims, 3 Drawing Sheets

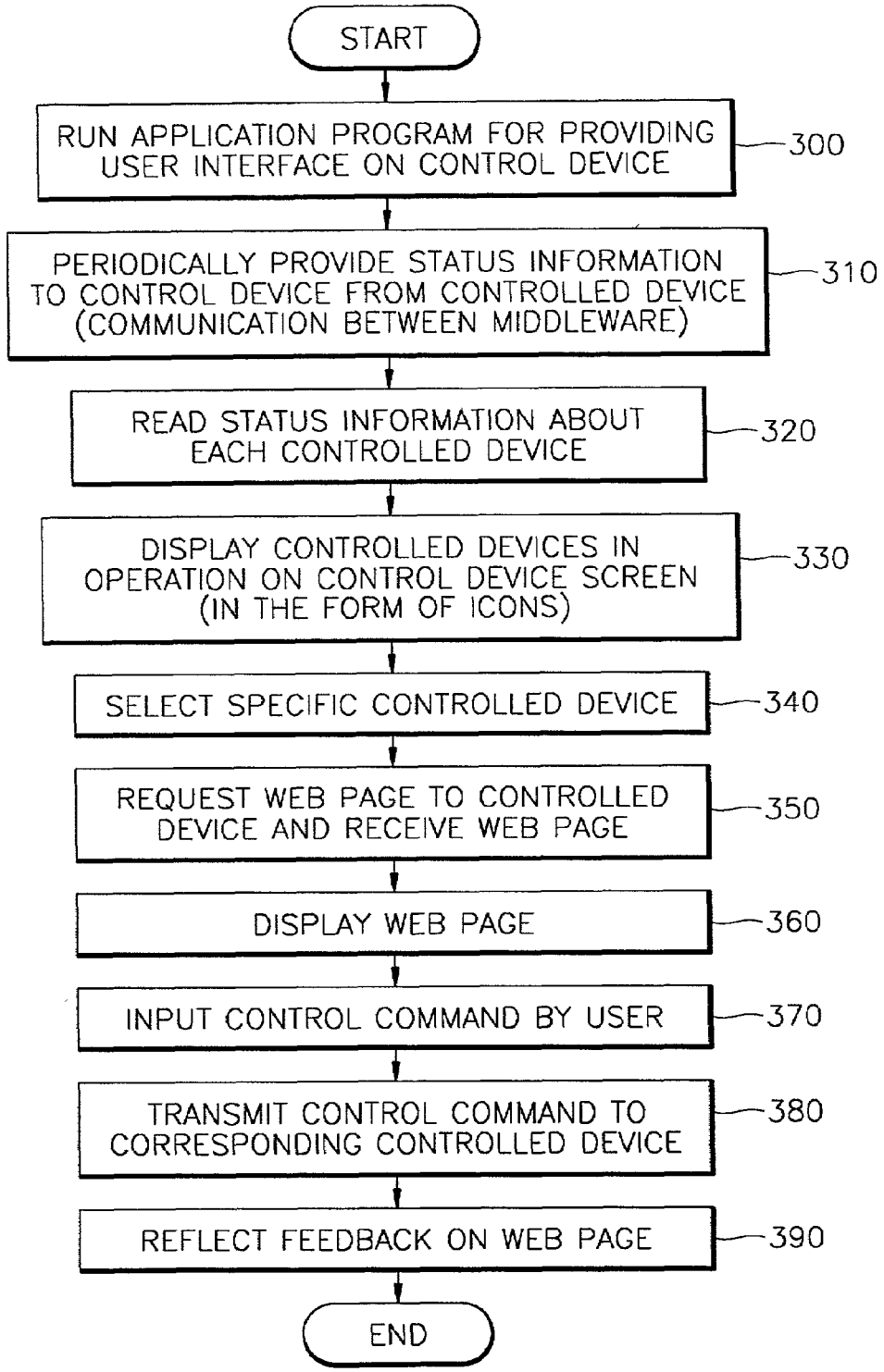

SYSTEM AND METHOD FOR CONTROLLING DEVICES IN HOME NETWORK ENVIRONMENT

BACKGROUND OF THE INVENTION

1. Field of the Invention

The present invention relates to a home network, and more particularly, to a method and system for displaying status information about each device and delivering control information in a home network environment. This application is based on Korean Patent Application No. 2001-19941 filed Apr. 13, 2001, the entire disclosure of which is herein incorporated by reference for all purposes.

2. Description of the Related Art

Recently, as various digital devices, such as digital TVs, digital VCRs, digital set-top boxes, etc., have emerged, digital features have been added to existing household electronic products such as refrigerators, washing machines, and microwave devices to couple them and form a home network environment. To control devices in a home network environment, functions for monitoring the status of various devices within a home network and delivering control commands at the request of a user are required. Typically, the home network uses middleware such as Jini, home audio/visual interoperability (Havi), or universal plug and play (UPnP), depending on the type of communication channels and the execution environment, such as an operating system of each device, and it requires an application program for interfacing with a user.

Since most devices used in the home network are household electronics products, they suffer from a large constraint on hardware resources for the home network itself and have no general usability in view of their limited operating system. Thus, in the home network environment, it is desired to minimize additional software resources required to run middleware and an application program that can perform a user interface function on a respective device. In particular, an embedded operating system used in a device within the home network not only is difficult to expand but also requires much cost in porting a new development or execution environment.

An application program for providing a user interface as well as functions for a conventional control point, receiving status information from a controlled device and transmitting a control command to the controlled device at the request of a user, is system dependent. Thus, the application program should be ported suitably for the operating system of the network system itself by using additional software resources. This incurs additional cost for devices on the home network.

Due to a resource constraint of the control point, the system has instability in graphic capabilities, in from time to time or periodically outputting status information about the controlled device by means of the application program, and it even tends to break down frequently.

SUMMARY OF THE INVENTION

To solve the above problems, it is an object of the present invention to provide a method and system for controlling devices in a home network environment that can run an application program for controlling devices on a home network and providing a user interface such that the application program is independent of the execution environment of each device. The application program is run directly by network software such as a web browser in order to reduce the cost required for additional software resources in association with the application program, and to use common software resources on each device as much as possible.

It is another object of the present invention to provide a method and system for controlling devices in a home network environment that can increase the effectiveness of a display by displaying only a controlled device whose status has been changed while preventing a user from inputting a command for a controlled device which is not in operation.

Accordingly, to achieve the above objects, the present invention provides a system and a method for controlling devices in a home network environment, according to which status information about a plurality of controlled devices on a home network is displayed in a control device, and a control command is transmitted to a corresponding controlled device after the control command is input to the control device by a user. The method includes the steps of: (a) running an application program for providing a user interface on the control device; (b) from time to time the control device receiving status information from the plurality of controlled devices; (c) the application program displaying controlled device information regarding controlled devices in operation on a display or screen of the control device referring to the status information received in step (b); (d) displaying a web page indicative of operation of a specific selected controlled device on the display or screen of the control device when the user selects the specific controlled device among the plurality of controlled devices; and (e) transmitting a control command to the controlled device following user input to the controlling device referring to the web page. The application program, may also be known to those skilled in the art as a network application program or network application module.

In step (c), the application program analyzes the status information periodically or from time to time received in step (b) and displays only controlled devices whose statuses have been changed and updated on the screen of the control device. In a preferred embodiment, the application program is run directly by a web browser system independent of the type of each controlled device. For example, the application program may be implemented using software such as using JavaScript.

Step (b) further comprises the step of (b1) transmitting the status information received from the middleware of the control device to the application program.

In a preferred embodiment, step (b) includes the steps of: (b1) the control device from time to time or periodically receiving status information from the plurality of controlled devices and (b2) transmitting the status information received from the middleware of the control device to the application program. Preferably, step (b1) is performed through communications between middleware of the control device and middleware of each controlled device.

The display or screen of the control device is preferably divided into several frames in order to separately display data displayed in steps (c) and (d) at the same time. Preferably, step (d) further includes the step of (d1) making a request to the controlled device selected by the user for a web page indicative of operation of the controlled device and receiving the web page. Preferably, step (e) further includes the step of (e1) receiving operation status information from the controlled device according to the control command and displaying the operation status on the screen of the control device.

In a preferred embodiment, when there is a controlled device from which status information has not been received in step (b) for a predetermined time, the application program clears the controlled device from the screen of the control device or deactivates the controlled device in step (c), thereby preventing the user from selecting the controlled device in step (d).

Although a specific order of steps is herein enumerated, it is contemplated that these steps may be performed in a number of different sequences, and further that there may be no particular sequence that is necessarily followed in all implementations, or even in all uses in the same implementation. Also, not all enumerated steps are necessarily executed during any use of the present method and system, as is well understood by a person of ordinary skill in the art.

The present invention also provides a system and method for controlling devices in a home network environment. The system includes: a plurality of controlled devices on a home network; and a control device including a display such as a screen, which displays status information about the plurality of controlled devices on the display and transmits a control command to each of the plurality of controlled devices after the control command is input to the control device by a user, the control device being coupled to the plurality of controlled devices via a home network.

In the system, an application program for providing a user interface is run on the control device, the control device from time to time or periodically receives the status information from each of the plurality of controlled devices and displays controlled device information about controlled devices in operation on the display through the application program. Preferably, a web page indicative of the operation of the controlled device is output to the display after the user selects the specific controlled device among the plurality of controlled devices, and the control command is transmitted to the controlled device after user input of the control command referring to the web page.

According to the system, the application program preferably analyzes the received status information and displays only controlled devices whose status has been changed and updated on the display screen. Furthermore, when there is a controlled device from which status information has not been received for a predetermined time, the application program clears the controlled device from the display of the control device or deactivates the controlled device, thereby preventing the user from selecting the controlled device.

BRIEF DESCRIPTION OF THE DRAWINGS

The above objects and advantages of the present invention will become more apparent by describing in detail preferred embodiments thereof with reference to the attached drawings in which:

FIG. 3 is a flowchart of a method for controlling devices in a home network environment according to an embodiment of the present invention.

DETAILED DESCRIPTION OF THE INVENTION

The present invention is aimed at eliminating overhead in porting performed because an application program for controlling devices within a conventional home network and providing a user interface is system dependent. Thus, the present invention implements an application program so that it is system independent and is run directly by a web browser. Since each device on a home network typically has a web server function, an application program that can be directly run through a web browser is used to eliminate system dependencies.

Figure 1:
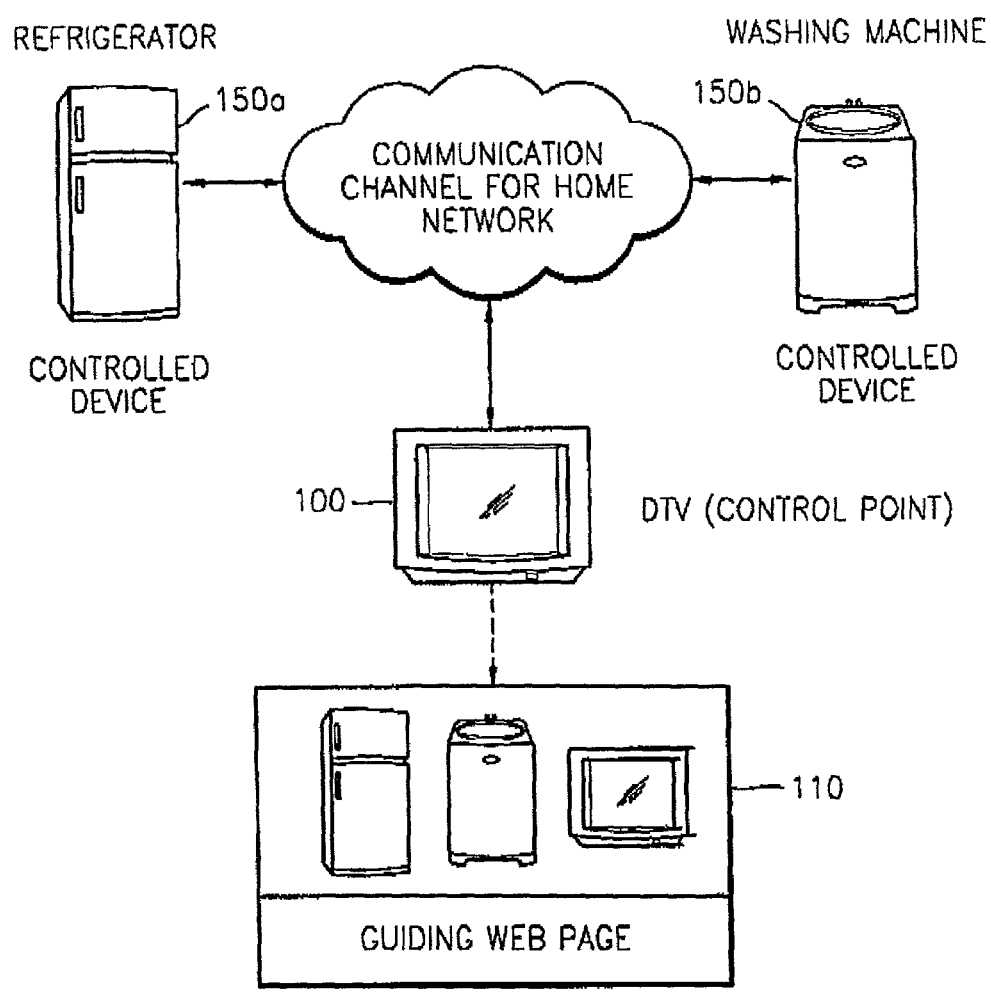
FIG. 1 is an example of a home network environment according to an embodiment of the present invention.

Referring to FIG. 1, a home network environment includes a plurality of controlled devices 150a and 150b and a control device (or control point) 100 interconnected by a communication channel for a home network (IEEE 1394 bus, Home Phoneline Networking Alliance (HPNA), or Internet, for example). The control device 100 basically including a display screen 110 displays status information about the controlled devices 150a and 150b on the screen 110. Also, the control device 100 transmits a control command to the controlled devices 150a and 150b when the control command is inputted to the control device 100 by a user, and provides a user interface for the user to input the command. The control device 100 is also a controlled device, displaying status information about itself and being controlled directly by the input of a control command by a user.

Figure 2:
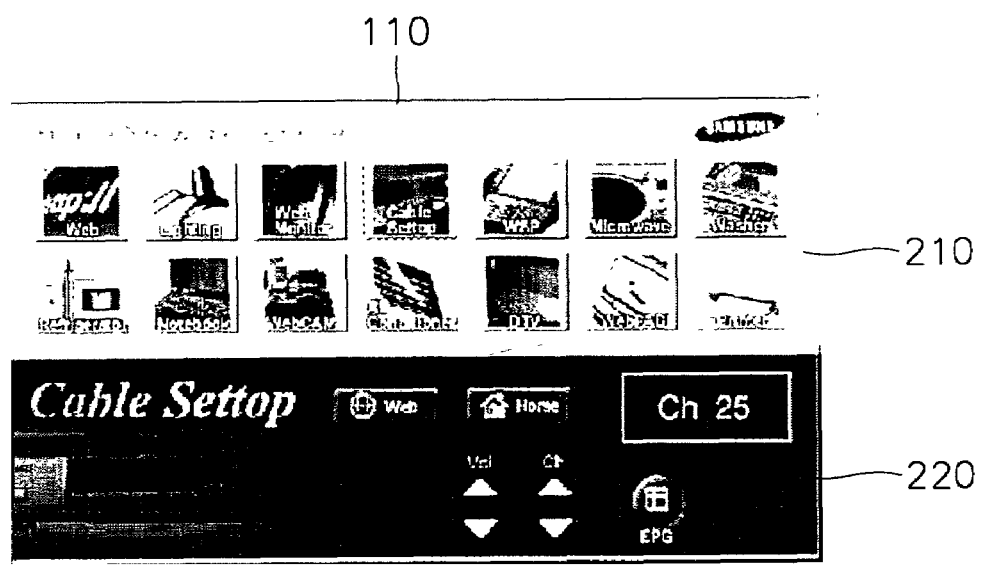
FIG. 2 is an example of a display or screen of a control device according to an embodiment of the present invention.

The display screen 110 of the control device 100 for controlling a home network (hereinafter referred to as a "home network screen") is preferably implemented as a part of the entire display screen for performing the functions of the controlled device. The home network screen 110 according to an embodiment of the present invention is divided into a portion that outputs status information about each of the controlled devices 150a and 150b (hereinafter called "status information output portion") and a portion that outputs a guiding web page informing a user about operation of the controlled devices 150a and 150b (hereinafter called "guiding web page output portion"). FIG. 2 is an example of the home network screen 110 of the control device 100 according to an embodiment of the present invention. Referring to FIG. 2, the home network screen 110 includes the status information output portion 210 and the guiding web page output portion 220. The status information output portion 210 displays controlled devices which are in operation in the form of icons.

A user interface on the home network screen 110 is managed through an application program that runs on the control device 100. An application program according to an embodiment of the present invention can be run directly by a web browser independently of a particular type of hardware or software of each device. For example, the application program may be implemented using JavaScript.

When the application program according to an embodiment of the present invention from time to time or periodically polls status information about the controlled devices 150a and 150b to display it on the home network screen 110, only the controlled device 150a or 150b whose status has been changed and updated is displayed on the home network screen 110, thereby minimizing overhead generated by outputting, from time to time or periodically, status information about each of the controlled devices 150a and 150b.

Furthermore, if a controlled device is in a non-operable state so that status information is not received from the device for a predetermined time, the controlled device is preferably removed from the home network screen 110 or deactivated, thereby preventing the user from inputting a control command for the controlled device.

The detailed operation of each device in a home network environment according to an embodiment of the present invention will now be described with reference to FIG. 3.

FIG. 3 is a flowchart of a method for controlling devices in a home network environment according to an embodiment of the present invention.

In step 300, an application program for providing a user interface function runs on a control device. Here, it is preferable that the application program is system independent and can be directly run by a web browser. For example, the application program may be implemented with JavaScript. In step 310, the control device periodically reads status information about a plurality of controlled devices. To this end, the controlled devices periodically provide their status information to the control device. Communications between each of the controlled devices and the control device in step 310 is generally made through middleware. In step 320, the status information received by the middleware of the control device is transmitted to the application program run in step 300.

Although it has been shown in FIG. 3 that step 310 is performed after the step 300 for ease of understanding, providing status information to the control device from each controlled device when the home network is in operation is defined in the middleware. Thus, it will be understood by those skilled in the art that status information may be provided regardless of the running of the application program.

In step 330, the application program displays controlled devices in operation on a home network screen of the control device referring to the status information about each controlled device transmitted in step 320. Here, the controlled devices in operation are preferably represented by icons thereby enhancing the user interface. That is, the application program reads status information about each controlled device and displays only the controlled devices whose statuses have changed and been updated on the home network screen, thereby minimizing overhead generated by periodically or from time to time displaying status information about each controlled device. Furthermore, if a controlled device is in a non-operable state so that status information is not received from the device for a predetermined time or upon the occurrence of a predetermined event, the controlled device is cleared from the home network screen 110 or deactivated, thereby preventing the user from inputting a control command for the controlled device.

In step 340, the user selects a specific controlled device on the home network screen. As is well known by those skilled in the art, step 340 may be performed in many ways including by clicking a mouse button or touching a corresponding area on a touch screen. In step 350, if a user input occurs in step 340, the application program sends a request to the controlled device for information indicative of operation of the controlled device and transmits a guiding web page for the controlled device. The guiding web page for operation of a controlled device may be requested each time a user input occurs, but if a guiding web page received as a result of a first request is stored, an additional request for the web page may not be made when subsequent user inputs occur. When necessary for the application, the guiding web page for a controlled device may be stored during initialization of the control device. In this case, step 350 performed when a user input occurs is not executed.

In step 360, the guiding web page indicating the operation of the controlled device selected by the user in step 340 is displayed on the home network screen. Here, as shown in FIG. 2, the guiding web page is designed so that the home network screen 110 is divided into several frames to output the frames together, thereby providing advantages of a user interface. In step 370, the user inputs a control command referring to the web page by, for example, clicking a mouse button or touching a corresponding area on a touch screen. In step 380, when the control command is input by the user, the application program transmits the control command to the controlled device. Then, in step 390, the controlled device operates according to the control command, and the application program outputs content fed back from the controlled device to the home network screen, thereby reflecting the operation status of the controlled device.

The operational status of a controlled device may include information particular to the type of device, as well as more generally applicable information such as for example whether the device is active or inactive, power indicator, and location. The more particular information for a washing machine for example may include settings and control information, load and cycle information, and/or statistical information about types of use or frequency of use to date. It will be understood by those skilled in the art that the type of information provided necessarily depends on the type of device and may vary widely depending on availability and user needs.

Embodiments of the present invention can be written as a program executed on a computer system. Furthermore, the program may be read from a computer-readable recording medium on which the program is stored to run it on a processing device such as a general-purpose digital computer system. Examples of the recording medium may include among other types of media a magnetic storage medium such as a ROM, a floppy disk, or a hard disk, an optical recording medium such as a CD-ROM or DVD, and carrier waves such as transmission over the Internet.

According to the present invention, the application program is constructed so that the application program is independent of an execution environment of a device and is run directly by a web browser, thereby reducing the cost required for additional software resources. Furthermore, only a controlled device whose status has been changed and updated is displayed on the screen of the control device, thereby increasing the effectiveness of a display and thus significantly reducing overhead generated by periodically displaying status information about a controlled device. In addition, the present invention prevents a user from inputting a control command for a controlled device in a non-operable state, thereby eliminating factors that make a system instable and improving the functions of a user interface.

It will be understood by those skilled in the art that although the present invention has been described as a home network environment, the present invention is not limited to implementations in a user's home. One or more controlled devices and/or one or more control devices may be located for example outside, in an automobile, ship, or other vehicle, in a garage, office or other building, or may be worn by a user. Indeed, the entire network may be located in one or more of these locations.

It will be similarly understood that a controlled device includes home appliances, as well as other types of electronic equipment capable of being coupled to a network, irrespective of where it is located. A control device may be implemented using a personal computer or using other types of digital processors, capable of being coupled to a network, including but not limited to laptops, notebooks, handheld and mobile devices and the like, as well as devices specifically adapted for such a purpose.

Further, the display coupled to the control device may be a CRT monitor, a flat screen or other type of screen, or it may be a projection projected to a user or some other type of display capable of conveying information to a user.

While this invention has been particularly shown and described with reference to a preferred embodiment thereof, it will be understood by those skilled in the art that various changes in form and details may be made therein without departing from the spirit and scope of the invention as defined by the appended claims. Therefore, the described embodiments are provided to aid in the explanation of the invention, and to enable one skilled in the art to make and use the invention, not to restrict the scope of the subject-matter claimed. The scope of the present invention is limited not by the foregoing description but by the following claims, and all differences within the range of equivalents thereof should be interpreted as being covered by the present invention.

Independent claim 25 is a means plus function claim expressly intended by the Applicant to be interpreted under 35 U.S.C. §112, Paragraph 6. No other claim is so intended.

What is claimed is:

1. A method of controlling devices in a home network environment, according to which status information about a plurality of controlled devices is displayed in a control device on a home network and a control command input to the control device by a user is transmitted to a corresponding controlled device, the method comprising:
   (a) running an application program configured to provide a user interface on said control device;
   (b) the control device from time to time receiving said status information from said plurality of controlled devices;
   (c) the application program displaying information regarding only controlled devices which are in operation on a display of said control device, referring to the status information received in step (b);
   (d) upon user selection of a controlled device among said plurality of controlled devices which are displayed in step (c), displaying on said display a web page indicative of operation of the selected controlled device; and
   (e) upon user input of a control command referring to said web page, transmitting said control command to said selected controlled device,
   wherein when status information relating to at least one operation of a particular one of said plurality of controlled devices has not been received from said plurality of controlled devices in step (b) for a predetermined time, the application program clears the information regarding said particular one of said plurality of controlled devices from said display of said control device or deactivates the information displayed on said display regarding said particular one of said plurality of controlled devices in step (c), thereby preventing a user from selecting said particular one of said plurality of controlled devices in step (d).

2. The method of claim 1, wherein in step (c), the application program analyzes the status information from time to time received in step (b) and displays information regarding only controlled devices whose statuses have been changed and updated on said display of said control device.

3. The method of claim 1, wherein the application program is run directly by a web browser system independent of each controlled device.

4. The method of claim 3, wherein said application program is implemented using JavaScript.

5. The method of claim 1, wherein step (b) is performed through communications between middleware of the control device and middleware of each controlled device.

6. The method of claim 5, wherein step (b) further comprises transmitting the status information received from the middleware of the control device to the application program.

7. The method of claim 1, wherein in step (c) the controlled devices in operation are represented by icons.

8. The method of claim 1, wherein said display of said control device is divided into at least two frames in order to separately display data displayed in steps (c) and (d) at the same time.

9. The method of claim 1, wherein step (d) further comprises making a request to a controlled device selected by a user from among said plurality of controlled devices for a web page indicative of operation of the controlled device and receiving the web page.

10. The method of claim 1, wherein step (e) further comprises receiving operation status information from said selected controlled device according to said control command and displaying said operation status information on said display of said control device.

11. A home network environment control system comprising:
   a plurality of controlled devices on a home network; and
   a control device, including a display, which displays status information regarding said plurality of controlled devices on said display, and transmits a control command to a selected controlled device among said plurality of controlled devices when said control command is input to said control device by a user, said control device being coupled to said plurality of controlled devices by said home network,
   wherein an application program configured to provide a user interface is run on said control device, said control device from time to time receives said status information from each of said plurality of controlled devices, and displays information regarding controlled devices in operation on said display through said application program, a web page indicative of operation of said selected controlled device is output to said display upon a user's selection of said selected controlled device among said plurality of controlled devices, and said control command is transmitted to said selected controlled device upon a user's input of said control command referring to said web page,
   wherein said application program displays information regarding only a controlled device among said plurality of controlled devices whose status has been changed and updated, on said display, and
   wherein when status information relating to at least one operation of a particular one of said plurality of controlled devices has not been received from said plurality of controlled devices for a predetermined time, the application program clears the information regarding said particular one of said plurality of controlled devices from said display of said control device or deactivates the information displayed on said display regarding said particular one of said plurality of controlled devices, thereby preventing a user from selecting said particular one of said plurality of controlled devices.

12. The system of claim 11, wherein said application program analyzes said status information received and displays information regarding only a controlled device among said plurality of controlled devices whose status has been changed and updated on said display.

13. The system of claim 11, wherein said application program is run directly by a web browser system independent of each controlled device.

14. The system of claim 13, wherein said application program is implemented using JavaScript.

15. A method of controlling devices in a home network environment comprising:
   receiving status information from time to time from a plurality of controlled devices coupled to a home network;
   providing a user interface configured to output to a display coupled to a control device,
   information regarding controlled devices in operation based on status information received from said plurality of controlled devices at said control device, to output to said display, upon a user's selection of a particular controlled device among said plurality of controlled devices, a page indicating operation information of said particular controlled device, and to receive from the user a control command directed to said particular controlled device; and
   transmitting to said selected controlled device a control command received through said user interface,
   wherein an application program displays information regarding only said particular controlled device among said plurality of controlled devices whose status has been changed and updated, on said display, and
   wherein when status information relating to at least one operation of a particular one of said plurality of controlled devices has not been received from said plurality of controlled devices for a predetermined time, the application program clears the information regarding said particular one of said plurality of controlled devices from said display of said control device or deactivates the information displayed on said display regarding said particular one of said plurality of controlled devices, thereby preventing a user from selecting said particular one of said plurality of controlled devices.

16. A method according to claim 15, wherein said method is performed by a network application program run by a web browser that is system independent of said plurality of controlled devices.

17. A method according to claim 16, wherein control device information is outputted to said display regarding only a controlled device among said plurality of controlled devices about which information has changed.

18. A home network environment device control system comprising:
   a network application module, coupled to a control device, wherein said control device receives input from a plurality of controlled devices coupled to a home network, to transmit an instruction to a first controlled device among said plurality of controlled devices, and to provide a user interface configured to report controlled device status information, receive a control command directed to said first controlled device among said plurality of controlled devices, and display, upon user selection of a controlled device among said plurality of controlled devices, a page indicating operation information of the selected controlled device,
   wherein the network application module displays information regarding only the controlled device among said plurality of controlled devices whose status has been changed and updated, on a display, and
   wherein when status information relating to at least one operation of a particular one of said plurality of controlled devices has not been received from said plurality of controlled devices for a predetermined time, an application program clears the information regarding said particular one of said plurality of controlled devices from said display of said control device or deactivates the information displayed on said display regarding said particular one of said plurality of controlled devices, thereby preventing a user from selecting said particular one of said plurality of controlled devices.

19. The system of claim 18, further comprising said control device connected to run said network application module.

20. The system according to claim 19, further comprising a display coupled to said control device, connected to display said user interface.

21. The system according to claim 18, wherein said network application module is run by a web browser system independent of said plurality of controlled devices.

22. A computer readable storage medium having program instructions for providing a method of controlling devices in a home network environment, said method comprising:
   receiving status information from time to time from a plurality of controlled devices coupled to a home network;
   providing a user interface configured to output to a display coupled to a control device, information regarding controlled devices in operation based on status information received from said plurality of controlled devices at said control device, to output to said display, upon a user's selection of a controlled device among said plurality of controlled devices, a page indicating operation information of the selected controlled device, and to receive from the user a control command directed to said selected controlled device; and
   transmitting to said selected controlled device a control command received through said user interface,
   wherein an application program displays information regarding only said selected controlled device among said plurality of controlled devices whose status has been changed and updated, on said display, and
   wherein when status information relating to at least one operation of a particular one of said plurality of controlled devices has not been received from said plurality of controlled devices for a predetermined time, the application program clears the information regarding said particular one of said plurality of controlled devices from said display of said control device or deactivates the information displayed on said display regarding said particular one of said plurality of controlled devices, thereby preventing a user from selecting said particular one of said plurality of controlled devices.

23. The computer readable storage medium according to claim 22, wherein said application program is run by a web browser that is system independent of said plurality of controlled devices.

24. A home network device control system comprising:
   means for receiving status information from time to time from a plurality of controlled devices coupled to a home network and for transmitting to a selected controlled device among said plurality of controlled devices a control command received through a user interface; and
   means for providing said user interface, said user interface being configured to output to a display coupled to a control device, information regarding controlled devices in operation based on status information received from said plurality of controlled devices at said control device, to output to said display, upon a user's selection of said selected controlled device, a page indicating operation information of said selected controlled device, and to receive from the user a control command directed to said selected controlled device, wherein an application program displays information regarding only said selected controlled device among said plurality of controlled devices whose status has been changed and updated, on said display, and wherein when status information relating to at least one operation of a particular one of said plurality of controlled devices has not been received from said plurality of controlled devices for a predetermined time, the application program clears the information regarding said particular one of said plurality of controlled devices from said display of said control device or deactivates the information displayed on said display regarding said particular one of said plurality of controlled devices, thereby preventing a user from selecting said particular one of said plurality of controlled devices.

25. A home network environment control system comprising:
   a plurality of controlled devices coupled to a home network;
   a control device coupled to said home network, system independent of said plurality of controlled devices, said control device configured to receive from time to time status information from each controlled device among said plurality of controlled devices;
   a display, coupled to said control device, connected to display a user interface; and
   a network application program run on said control device, configured to provide said user interface configured to display on said display status information about controlled devices in operation and to display, upon a user's selection of a controlled device among said plurality of controlled devices, a web page indicative of operational status of the selected controlled device, and said network application program further configured to transmit a control command to said selected controlled device upon the user's input of said control command referring to said web page, wherein said network application program displays information regarding only said selected controlled device among said plurality of controlled devices whose status has been changed and updated, on said display, and wherein when status information relating to at least one operation of a particular one of said plurality of controlled devices has not been received from said plurality of controlled devices for a predetermined time, the application program clears the information regarding said particular one of said plurality of controlled devices from said display of said control device or deactivates the information displayed on said display regarding said particular one of said plurality of controlled devices, thereby preventing a user from selecting said particular one of said plurality of controlled devices.

* * * * *